United States Patent
Kim et al.

(10) Patent No.: US 8,625,528 B2
(45) Date of Patent: Jan. 7, 2014

(54) TERMINAL FOR HANDOVER USING CHANNEL CHARACTERISTICS AND CONTROL METHOD THEREOF

(75) Inventors: Roe-Kwan Kim, Suwon-si-Gyeonggi-do (KR); Joon-Young Jung, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 712 days.

(21) Appl. No.: 12/290,290

(22) Filed: Oct. 29, 2008

(65) Prior Publication Data

US 2009/0143068 A1    Jun. 4, 2009

(30) Foreign Application Priority Data

Nov. 29, 2007    (KR) .................. 10-2007-0122605

(51) Int. Cl.
*H04W 4/00*        (2009.01)
(52) U.S. Cl.
USPC ........................... 370/331; 370/332; 370/333
(58) Field of Classification Search
None
See application file for complete search history.

(56) References Cited

U.S. PATENT DOCUMENTS

| | | | | |
|---|---|---|---|---|
| 5,701,585 A | * | 12/1997 | Kallin et al. | 455/437 |
| 5,745,523 A | * | 4/1998 | Dent et al. | 375/216 |
| 5,960,335 A | * | 9/1999 | Umemoto et al. | 455/226.2 |
| 6,021,125 A | * | 2/2000 | Sakoda et al. | 370/345 |
| 6,212,384 B1 | * | 4/2001 | Almgren et al. | 455/446 |
| 6,434,390 B2 | * | 8/2002 | Rahman | 455/440 |
| 7,110,733 B1 | * | 9/2006 | Aoyama | 455/137 |
| 7,327,990 B2 | * | 2/2008 | Kimata | 455/101 |
| 2003/0220120 A1 | * | 11/2003 | Hagin-Metzer et al. | 455/504 |
| 2004/0043767 A1 | * | 3/2004 | Tsutsumi et al. | 455/432.1 |
| 2004/0072571 A1 | * | 4/2004 | Halonen et al. | 455/450 |
| 2004/0192347 A1 | * | 9/2004 | Leizerovich et al. | 455/456.1 |
| 2004/0224639 A1 | * | 11/2004 | Melero | 455/67.11 |
| 2004/0259503 A1 | * | 12/2004 | Ogura | 455/67.11 |
| 2005/0014515 A1 | * | 1/2005 | Suzuki | 455/456.1 |
| 2006/0046765 A1 | * | 3/2006 | Kogure | 455/522 |
| 2007/0191044 A1 | * | 8/2007 | Kostic et al. | 455/522 |
| 2007/0213056 A1 | * | 9/2007 | Im et al. | 455/436 |
| 2009/0143068 A1 | * | 6/2009 | Kim et al. | 455/436 |

* cited by examiner

*Primary Examiner* — Otis L Thompson, Jr.

(57) ABSTRACT

A terminal for handover using channel characteristics and a control method thereof are provided. Reception level information is received from a neighboring base station. A state of the neighboring base station having transmitted the reception level information is measured. A corresponding neighboring base station to which the handover is possible is selected using a corrected reception level value by computing the corrected reception level value using a value of the reception level information received from the neighboring base station and a channel characteristic value of the neighboring base station. A better neighboring base station for the handover can be selected by applying a reception level based on detected channel characteristics (quality) of a corresponding neighboring base station even when an actually measured reception level of the neighboring base station is high.

20 Claims, 2 Drawing Sheets

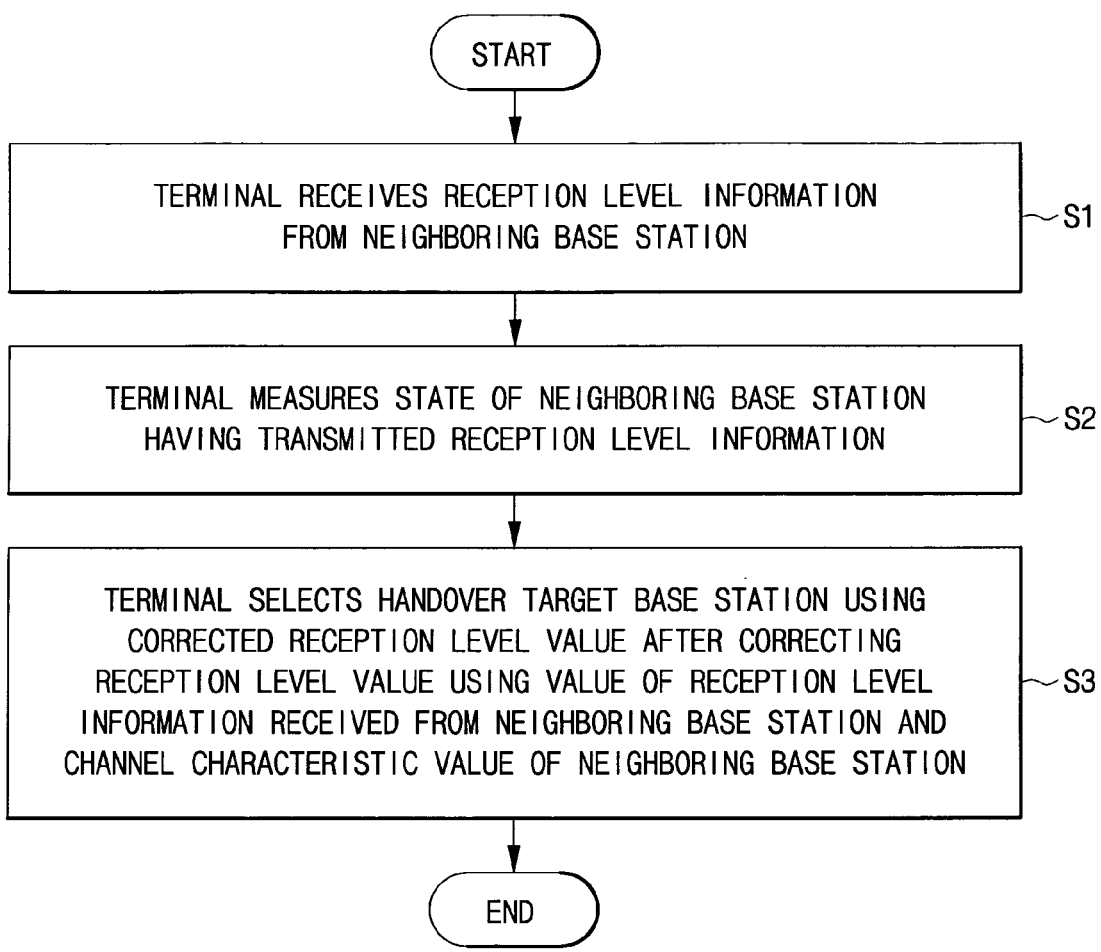

TERMINAL FOR HANDOVER USING CHANNEL CHARACTERISTICS AND CONTROL METHOD THEREOF

CROSS-REFERENCE TO RELATED APPLICATION(S) AND CLAIM OF PRIORITY

The present application claims the benefit under 35 U.S.C. §119(a) from an application entitled "Terminal for handover using channel characteristics and control method thereof" filed in the Korean Intellectual Property Office on Nov. 29, 2007 and assigned Serial No. 2007-0122605, the entire contents of which are hereby incorporated herein by reference.

TECHNICAL FIELD OF THE INVENTION

The present invention relates to a terminal for handover using channel characteristics.

BACKGROUND OF THE INVENTION

In general, handover (also known as handoff; hereinafter, referred to as handover) is an important technology for a mobile communication system to switch a radio channel in use. When a user terminal moves to a radio wave arrival range of another wireless base station beyond a radio wave arrival range of one wireless base station, the handover is an operation for transferring the management of the user terminal between the two wireless base stations. Here, the wireless base station is a device that wirelessly communicates with the user terminal and may be referred to by other names. The user terminal may receive a seamless service even when moving from a serving wireless base station to another wireless base station through the handover.

To successfully perform the above-described handover, information regarding a neighboring base station should be possessed.

Conventionally, the handover may be based on the reception level and quality of a serving base station and the transmission power and level measured in the serving base station and may use the reception level reported from a cell of a neighboring base station along therewith.

In measured information of neighboring base stations, only a base station identity code (BSIC), that is, base station information, and an average value of reception levels measured during a measurement period may be reported.

Four factors—the reception power, the reception quality, the transmission power, and the transmission quality—may be used with respect to the serving base station, but only the reception level may be measured with respect to the neighboring base station. Since quality information may not be used with respect to the neighboring base station, there is a problem in that the handover should be performed again due to actual low quality in a cell of a target base station even when the handover to the target base station is actually performed, or the handover may fail and a return to a previous channel may be disabled due to the steep degradation of quality.

SUMMARY OF THE INVENTION

To address the above-discussed deficiencies of the prior art, it is a primary object to provide a terminal for handover using channel characteristics and a control method thereof that can correct a reception level for a neighboring base station by extending information for neighboring base stations capable of being selected as a handover target base station (cell) and computing a bit error rate, a bad frame indication count, and/or a sync error (fail) count related to the neighboring base station in addition to a reception level value.

According to an aspect of the present invention, there is provided a terminal for handover using channel characteristics, including: a receiver that receives reception level information from a neighboring base station; a base station state measurer that measures a state of the neighboring base station having transmitted the reception level information; and a base station selector that selects a corresponding neighboring base station to which the handover is possible using a corrected reception level value by computing the corrected reception level value using a value of the reception level information received from the neighboring base station and a channel characteristic value of the neighboring base station.

When detecting the channel characteristic value of the neighboring base station, one of a frequency correction channel (FCH), a synchronization channel (SCH), and a broadcast control channel (BCCH) may be used. The channel characteristic value of the neighboring base station may use one of a bit error rate, a bad frame indication count, and a sync error count.

The base station selector may compute the corrected reception level value of (Reception Level×Channel Characteristic Value (%)×Preset Weight Value).

According to another aspect of the present invention, there is provided a control method of a terminal for handover using channel characteristics, including the steps of: receiving reception level information from a neighboring base station; measuring a state of the neighboring base station having transmitted the reception level information; and selecting a corresponding neighboring base station to which the handover is possible using a corrected reception level value by computing the corrected reception level value using a value of the reception level information received from the neighboring base station and a channel characteristic value of the neighboring base station.

When detecting the channel characteristic value of the neighboring base station, one of an FCH, an SCH, and a BCCH may be used. The channel characteristic value of the neighboring base station may use one of a bit error rate, a bad frame indication count, and a sync error count.

The step of selecting the corresponding neighboring base station to which the handover is possible may include the step of: computing the corrected reception level value of (Reception Level×Channel Characteristic Value (%)×Preset Weight Value).

According to exemplary embodiments of the present invention, a terminal for handover using channel characteristics and a control method thereof can select a better neighboring base station for the handover by applying a reception level based on detected channel characteristics (quality) of a corresponding neighboring base station even when an actually measured reception level of the neighboring base station is high.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a flowchart illustrating a control method of the terminal for handover using channel characteristics according to an exemplary embodiment of the present invention.

DETAILED DESCRIPTION OF THE INVENTION

Figure 1:
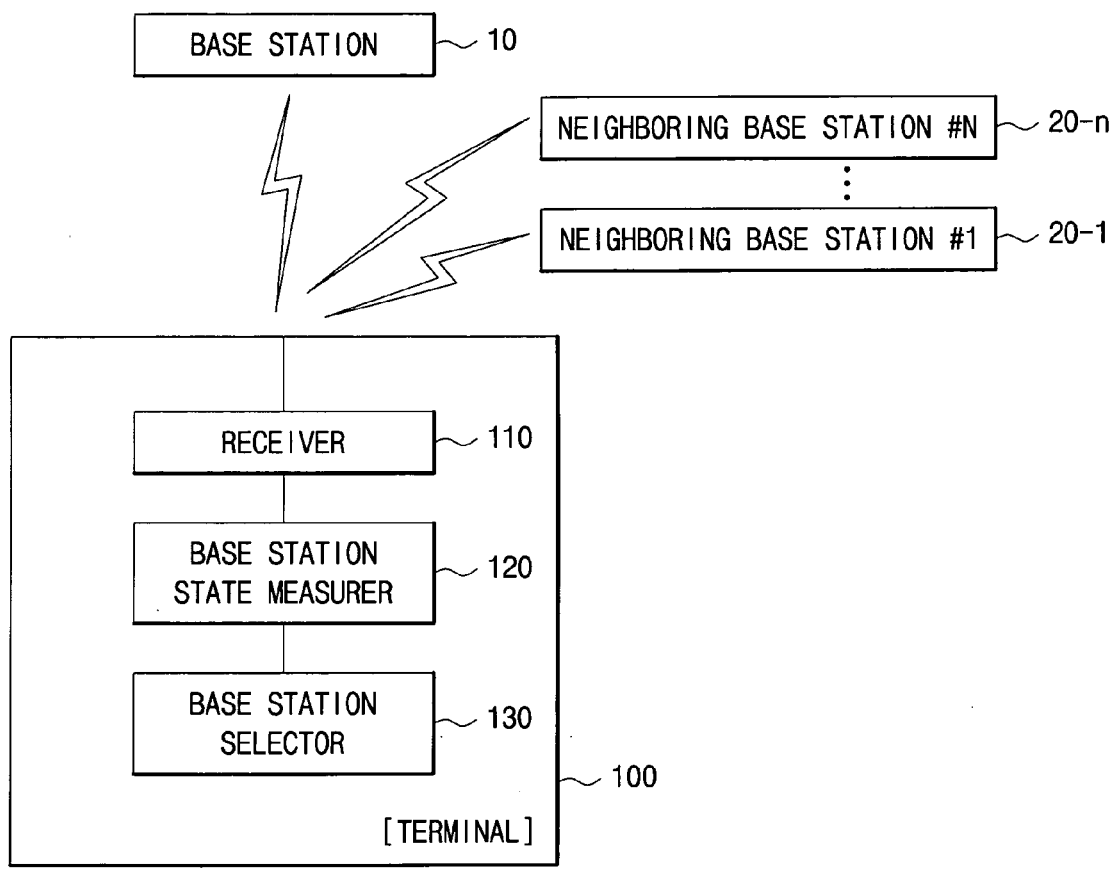
FIG. 1 is a functional block diagram illustrating a configuration of a terminal for handover using channel characteristics according to an exemplary embodiment of the present invention.

FIGS. 1 through 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

FIG. 1 is a functional block diagram illustrating a configuration of a terminal for handover using channel characteristics according to an exemplary embodiment of the present invention. According to the exemplary embodiment of the present invention, the terminal 100 for handover using channel characteristics includes a receiver 110, a base station state measurer 120, and a base station selector 130.

The receiver 110 receives reception level information from a neighboring base station 20-1, - - - , or 20-$n$.

The base station state measurer 120 measures a state of the neighboring base station 20-1, - - - , or 20-$n$ having transmitted the reception level information. When a channel characteristic value of the neighboring base station 20-1, - - - , or 20-$n$ is detected, the base station state measurer 120 can use one of an FCH, an SCH, and a BCCH, and can use one of a bit error rate, a bad frame indication count, and a sync error count. The base station selector 130 can detect a handover target base station by computing a corrected reception level value of (Reception Level×Channel Characteristic Value (%)×Preset Weight Value).

Here, the FCH is broadcast from the base station 10 and is used for frequency correction by the terminal 100.

The SCH is broadcast from the base station 10 and is used for frame synchronization by the terminal 100. The SCH can include BSIC information.

The BCCH is used to broadcast general information for the base station 10 and a network and is used to indicate a common control channel (CCCH) configuration.

The base station selector 130 corrects a reception level value using a value of the reception level information received from the neighboring base station 20-1, - - - , or 20-$n$ and the channel characteristic value of the neighboring base station 20-1, - - - , or 20-$n$, and selects a corresponding neighboring base station 20-1, - - - , or 20-$n$ to which the handover is possible using the corrected reception level value. At this time, the base station selector 130 can perform a comparison operation using a data table (not illustrated) so as to select the handover target base station.

Descriptions of well-known functions and constructions are omitted and operations related to the present invention will be mainly described.

First, a serving base station 10 currently providing a service according to call setup provides reception level information, reception quality information, transmission level information, and transmission quality information to a terminal 100.

On the other hand, the neighboring base station 20-1, - - - , or 20-$n$ provides only reception level information to the terminal 100. At this time, the receiver 110 of the terminal 100 can receive not only the reception level information, the reception quality information, the transmission level information, and the transmission quality information from the serving base station 10, but also the reception level information from the neighboring base station 20-1, - - - , or 20-$n$.

The base station state measurer 120 of the terminal 100 determines a channel characteristic value of the corresponding neighboring base station 20-1, - - - , or 20-$n$ using one of a bit error rate, a bad frame indication count, and a sync error count related to the neighboring base station 20-1, - - - , or 20-$n$.

The base station selector 130 of the terminal 100 corrects a value of the reception level information received from the neighboring base station 20-1, - - - , or 20-$n$ using the channel characteristic value (or one of the bit error rate, the bad frame indication count, and the sync error count) of the neighboring base station 20-1, - - - , or 20-$n$, thereby selecting a corresponding neighboring base station 20-1, - - - , or 20-$n$ to which the handover is possible using the corrected reception level value.

A control method of the terminal having the above-described configuration for handover using channel characteristics according to an exemplary embodiment of the present invention will be described with reference to FIG. 2.

First, the terminal 100 receives reception level information from the neighboring base station 20-1, - - - , or 20-$n$ (S1).

The base station state measurer 120 measures a state of the neighboring base station 20-1, - - - , or 20-$n$ having transmitted the reception level information (S2). When a channel characteristic value of the neighboring base station 20-1, - - - , or 20-$n$ is detected, the base station state measurer 120 can use one of an FCH, an SCH, and a BCCH, and can use one of a bit error rate, a bad frame indication count, and a sync error count.

The base station selector 130 selects a corresponding neighboring base station 20-1, - - - , or 20-$n$ to which the handover is possible using a corrected reception level value by computing the corrected reception level value using a value of the reception level information received from the neighboring base station 20-1, - - - , or 20-$n$ and the channel characteristic value of the neighboring base station 20-1, - - - , or 20-$n$ (S3).

At this time, the base station selector 130 can select the handover target base station by computing the corrected reception level value of (Reception Level×Channel Characteristic Value (%)×Preset Weight Value).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A terminal configured to perform a handover using channel characteristics, comprising:
a receiver configured to receive reception level information from a neighboring base station;

a base station state measurer configured to measure a state of the neighboring base station having transmitted the reception level information; and a base station selector configured to select a corresponding neighboring base station to which the handover is possible using a corrected reception level value by computing the corrected reception level value using a value of the reception level information received from the neighboring base station multiplied by a channel characteristic value of the neighboring base station and a preset weight value, the channel characteristic value determined using a bad frame indication count or a sync error count.

2. The terminal of claim 1, wherein when detecting the channel characteristic value of the neighboring base station, one of a frequency correction channel (FCH), a synchronization channel (SCH), and a broadcast control channel (BCCH) is used.

3. The terminal of claim 1, wherein the channel characteristic value of the neighboring base station is determined using a bit error rate.

4. The terminal of claim 1, wherein the base station selector computes the corrected reception level value using the following equation:

corrected reception level value=(Reception Level× Channel Characteristic Value (%)×Preset Weight Value).

5. A control method of a terminal configured to perform a handover using channel characteristics, comprising:

receiving reception level information from a neighboring base station;

measuring a state of the neighboring base station having transmitted the reception level information; and selecting a corresponding neighboring base station to which the handover is possible using a corrected reception level value by computing the corrected reception level value using a value of the reception level information received from the neighboring base station multiplied by a channel characteristic value of the neighboring base station and a preset weight value, the channel characteristic value determined using a bad frame indication count or a sync error count.

6. The control method of claim 5, wherein when detecting the channel characteristic value of the neighboring base station, one of an FCH, an SCH, and a BCCH is used.

7. The control method of claim 6, wherein the channel characteristic value of the neighboring base station is determined using a bit error rate.

8. The control method of claim 5, wherein selecting the corresponding neighboring base station to which the handover is possible includes computing the corrected reception level value using the following equation:

corrected reception level value=(Reception Level× Channel Characteristic Value (%)×Preset Weight Value).

9. The control method of claim 5 further comprising:

correcting a reception level for the neighboring base station; and computing one of a bit error rate, a bad frame indication count and a sync error count related to the neighboring base station in addition to the corrected reception level value.

10. The terminal of claim 1 wherein the terminal is configured to correct a reception level for the neighboring base station and computes one of a bit error rate, a bad frame indication count and a sync error count related to the neighboring base station in addition to the corrected reception level value.

11. A wireless communication system comprising:

a plurality of base stations; and at least one terminal configured to perform a handover using channel characteristics, the terminal comprising:

a receiver configured to receive reception level information from a neighboring base station;

a base station state measurer configured to measure a state of the neighboring base station having transmitted the reception level information; and a base station selector configured to select a corresponding neighboring base station to which the handover is possible using a corrected reception level value by computing the corrected reception level value using a value of the reception level information received from the neighboring base station multiplied by a channel characteristic value of the neighboring base station and a preset weight value, the channel characteristic value determined using a bad frame indication count or a sync error count.

12. The wireless communication system of claim 11 wherein the terminal uses one of a frequency correction channel (FCH), a synchronization channel (SCH), and a broadcast control channel (BCCH) when detecting the channel characteristic value of the neighboring base station.

13. The wireless communication system of claim 11 wherein the channel characteristic value of the neighboring base station is determined using a bit error rate.

14. The wireless communication system of claim 11 wherein the base station selector is configured to compute the corrected reception level value using the following equation:

corrected reception level value=(Reception Level× Channel Characteristic Value (%)×Preset Weight Value).

15. The wireless communication system of claim 11 wherein the terminal is configured to correct a reception level for the neighboring base station and computes one of a bit error rate, a bad frame indication count and a sync error count related to the neighboring base station in addition to the corrected reception level value.

16. A method for operating a wireless communication system that comprises a plurality of base stations and at least one terminal configured to perform a handover using channel characteristics, the method comprising:

receiving by the at least one terminal reception level information from a neighboring base station;

measuring a state of the neighboring base station having transmitted the reception level information; and selecting a corresponding neighboring base station to which the handover is possible using a corrected reception value by computing the corrected reception level value using a value of the reception level information received from the neighboring base station multiplied by a channel characteristic value of the neighboring base station and a preset weight value, the channel characteristic value determined using a bad frame indication count or a sync error count.

17. The method of claim 16 wherein one of a frequency correction channel (FCH), a synchronization channel (SCH), and a broadcast control channel (BCCH) is used when detecting the channel characteristic value of the neighboring base station.

18. The method of claim 17 wherein the channel characteristic value of the neighboring base station is determined using a bit error rate.

19. The method of claim 16 wherein selecting the corresponding neighboring base station to which the handover is possible includes computing the corrected reception level value using the following equation:

$$\text{corrected reception level value} = (\text{Reception Level} \times \text{Channel Characteristic Value (\%)} \times \text{Preset Weight Value}).$$

20. The method of claim 16 further comprising:
   correcting a reception level for the neighboring base station; and
   computing one of a bit error rate, a bad frame indication count and a sync error count related to the neighboring base station in addition to the corrected reception level value.

* * * * *